(12) United States Patent
Karp et al.

(10) Patent No.: US 9,400,604 B2
(45) Date of Patent: *Jul. 26, 2016

(54) WRITE PROCEDURE USING ESTIMATED BEST SETTING IN FIRST RUN

(71) Applicant: International Business Machines Corporation, Armonk, NY (US)

(72) Inventors: James M. Karp, Tucson, AZ (US); Takashi Katagiri, Yamato (JP); Yuhko Mori, Kanagawa (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,565

(22) Filed: Jun. 10, 2015

(65) Prior Publication Data

US 2015/0277777 A1 Oct. 1, 2015

Related U.S. Application Data

(63) Continuation of application No. 13/449,219, filed on Apr. 17, 2012.

(51) Int. Cl.
*G06F 12/00* (2006.01)
*G06F 3/06* (2006.01)
*G11B 5/008* (2006.01)

(52) U.S. Cl.
CPC ............ *G06F 3/0608* (2013.01); *G06F 3/0653* (2013.01); *G06F 3/0659* (2013.01);
(Continued)

(58) Field of Classification Search
CPC . G06F 9/445; G06F 11/1441; G06F 12/0246; G06F 12/0804; G06F 12/0866; G06F 3/0605; G06F 3/0608; G06F 3/0682; G06F 3/00659; G06F 2003/0698
See application file for complete search history.

(56) References Cited

U.S. PATENT DOCUMENTS 6,469,967 B1 10/2002 Mau et al.
6,856,479 B2 2/2005 Jaquette et al.
(Continued)

FOREIGN PATENT DOCUMENTS

| CN | 1568520 A | 1/2005 |
|---|---|---|
| JP | 2007073108 A | 3/2007 |
| WO | 03065374 A1 | 8/2003 |

OTHER PUBLICATIONS

Examiner's Answer to Appeal Brief from U.S. Appl. No. 13/761,095, dated Mar. 2, 2015.
(Continued)

*Primary Examiner* — David X Yi
*Assistant Examiner* — Candice Rankin
(74) *Attorney, Agent, or Firm* — Zilka-Kotab, PC

(57) ABSTRACT

In one general embodiment, a method includes receiving a request for a write operation to be performed in a tape drive; determining a capacity margin ratio of the tape drive; determining an optimum a write procedure based at least in part on the capacity margin ratio; and invoking the optimum write procedure in response to determining the optimum write procedure. The optimum write procedure is selected from the group consisting of: a backhitch write procedure, a same wrap backhitchless flush (SWBF) write procedure, and a recursively accumulating backhitchless flush (RABF) write procedure. Systems and computer program products configured to perform similar techniques are also disclosed.

19 Claims, 7 Drawing Sheets

(52) U.S. Cl.
CPC .......... *G06F3/0682* (2013.01); *G11B 5/00813* (2013.01); *G11B 5/00817* (2013.01); *G06F 2003/0698* (2013.01); *G11B 2220/90* (2013.01)

(56) References Cited

U.S. PATENT DOCUMENTS

| | | |
|---|---|---|
| 7,496,539 B1 | 2/2009 | Bai et al. |
| 7,710,681 B2 | 5/2010 | Itagaki et al. |
| 7,900,011 B2 | 3/2011 | Amundsen et al. |
| 7,903,363 B2 | 3/2011 | Itagaki et al. |
| 8,035,912 B2 | 10/2011 | Katagiri et al. |
| 2003/0142428 A1 | 7/2003 | Jauette et al. |
| 2006/0002002 A1 | 1/2006 | Jaquette |
| 2009/0296268 A1 | 12/2009 | Katagiri et al. |
| 2012/0002317 A1 | 1/2012 | Hirata et al. |
| 2012/0239871 A1 | 9/2012 | Badam et al. |
| 2013/0275666 A1 | 10/2013 | Karp et al. |
| 2013/0275667 A1 | 10/2013 | Karp et al. |

OTHER PUBLICATIONS

Second or Subsequent Examiner's Answer to Appeal Brief from U.S. Appl. No. 13/761,095, dated Mar. 23, 2015.
Examiner's Answer to Appeal Brief from U.S. Appl. No. 13/449,219, dated Feb. 24, 2015.
Karp et al., U.S. Appl. No. 13/449,219, filed Apr. 17, 2012.
Non-Final Office Action from U.S. Appl. No. 13/449,219, dated Nov. 22, 2013.
Final Office Action from U.S. Appl. No. 13/449,219, dated May 12, 2013.
Karp et al., U.S. Appl. No. 13/761,095, filed Feb. 6, 2013.
Non-Final Office Action from U.S. Appl. No. 13/761,095, dated Nov. 22, 2013.
Final Office Action from U.S. Appl. No. 13/761,095, dated May 9, 2014.
Melber, A., "Session STA05 What's New With IBM Tape," IBM System Storage and Storage Networking Technical Symposium, Sep. 8-11, 2008, pp. 1-67.
Office Action from Chinese Application No. 201310132611.7, dated Jul. 31, 2015.

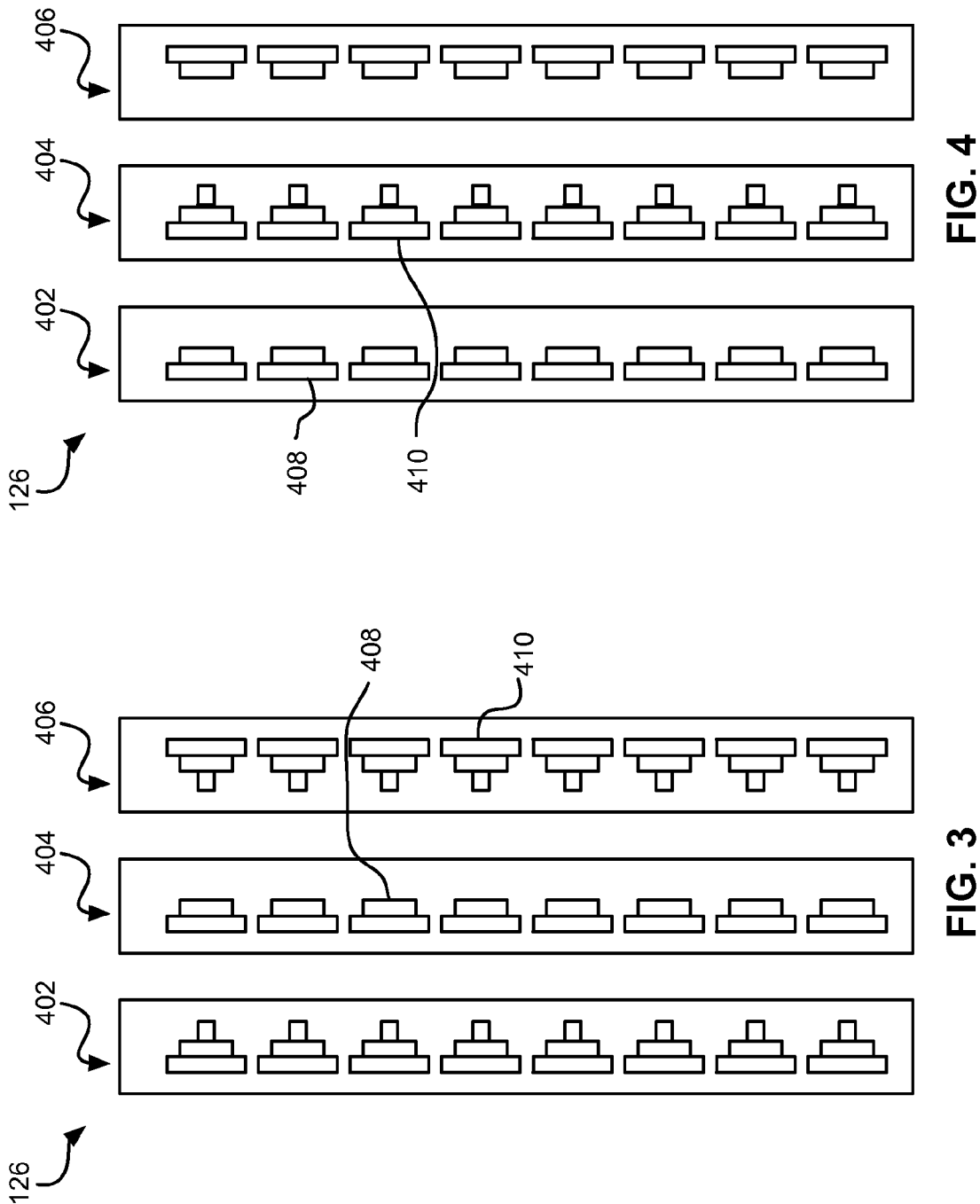

WRITE PROCEDURE USING ESTIMATED BEST SETTING IN FIRST RUN

RELATED APPLICATIONS

The present application is a continuation of U.S. patent application Ser. No. 13/449,219, filed Apr. 17, 2012, which is herein incorporated by reference.

BACKGROUND

The present invention relates to data storage systems, and more particularly, this invention relates to using a best setting determined according to select tape operating parameters during a write procedure (WP).

A tape drive is adapted to read and/or write data from/to a magnetic tape using a range of tape speeds which are preset in the tape drive (for example, one tape drive may operate at 14 different tape speeds). Typically, write procedure performs a plurality of steps to accomplish a write operation.

However, these steps are typically performed in a predetermined order, which is applied the same way in all cases, regardless of the tape cartridge, the tape cartridge/drive combination, and the circumstances surrounding the write operation. Accordingly, it would be beneficial to have a tape drive system that is capable of determining and invoking an optimum write procedure according to a specific tape cartridge, tape cartridge/drive combination, and/or circumstances surrounding the write operation.

BRIEF SUMMARY

In one embodiment, a method includes receiving a request for a write operation to be performed in a tape drive; determining a capacity margin ratio of the tape drive; determining an optimum a write procedure based at least in part on the capacity margin ratio; and invoking the optimum write procedure in response to determining the optimum write procedure. The optimum write procedure is selected from the group consisting of: a backhitch write procedure, a same wrap backhitchless flush (SWBF) write procedure, and a recursively accumulating backhitchless flush (RABF) write procedure.

In another embodiment, a computer program product includes a computer readable program medium having stored thereon computer readable program instructions configured to cause a tape storage system to: receive a request for a write operation to be performed in a tape drive; determine a capacity margin ratio of the tape drive; determine an optimum a write procedure based at least in part on the capacity margin ratio; and invoke the optimum write procedure in response to determining the optimum write procedure. The optimum write procedure is selected from the group consisting of: a backhitch write procedure, a same wrap backhitchless flush (SWBF) write procedure, and a recursively accumulating backhitchless flush (RABF) write procedure.

In still another embodiment, a method includes receiving a request for a write operation to be performed in a tape drive; determining an expected transaction size of a next write operation; comparing the expected transaction size of the next write operation to each of a first transaction size threshold and a second transaction size threshold in response to receiving the request; determining an optimum a write procedure based at least in part on a result of the comparing; and invoking the optimum write procedure in response to determining the optimum write procedure. The first transaction size threshold is greater than the second transaction size threshold. The optimum write procedure is selected from the group consisting of: a backhitch write procedure, a same wrap backhitchless flush (SWBF) write procedure, and a recursively accumulating backhitchless flush (RABF) write procedure. Determining the optimum write procedure includes: determining a capacity margin ratio; calculating an expected writing time for each of the backhitch write procedure, the SWBF write procedure, and the RABF write procedure; determining an expected time remaining until the next write operation; and selecting the optimum write procedure based on at least one of: the backhitch write procedure expected writing time, the SWBF write procedure expected writing time, the RABF write procedure expected writing time, the expected transaction size of the next write operation, the capacity margin ratio, and the expected time remaining until the next write operation.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration, according to one embodiment.

FIG. 4 is a partial tape bearing surface view of a magnetic head having a read-write-read configuration, according to one embodiment.

DETAILED DESCRIPTION

Figure 1:
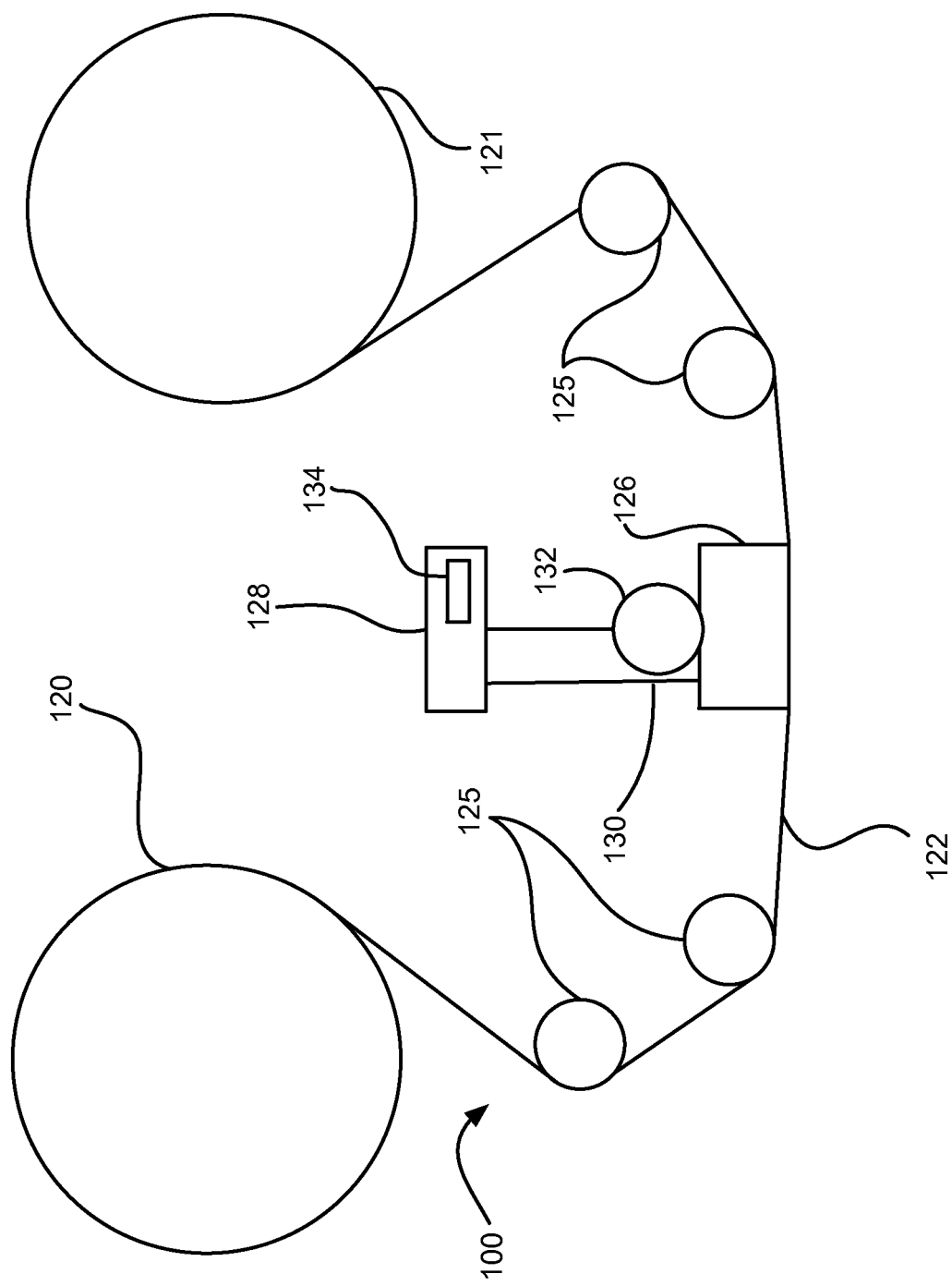
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a tape-based data storage system includes: a read channel; a write channel; logic configured to receiving a request for a write operation to be performed in a tape drive; logic configured to determine an optimum a write procedure in response to receiving the request, the determining being based on expected writing times of each of a plurality of write procedures and an expected transaction size of a next write operation; and logic configured to invoke the determined optimum write procedure in response to determining the optimum write procedure.

In another general embodiment, a computer program product includes non-transitory computer readable program code embodied on a computer readable storage medium, the computer readable program code including: computer readable program code configured to receiving a request for a write operation to be performed in a tape drive; computer readable program code configured to determine an expected transaction size of a next write operation; computer readable program code configured to compare the expected transaction size of the next write operation to each of a first transaction size threshold and a second transaction size threshold in response to receiving the request; computer readable program code configured to determine an optimum a write procedure based at least in part on the comparison; and computer readable program code configured to invoke the optimum write procedure in response to determining the optimum write procedure.

In still another general embodiment, a method, includes: receiving a request for a write operation to be performed in a tape drive; determining an expected transaction size of a next write operation; comparing the expected transaction size of the next write operation to each of a first transaction size threshold and a second transaction size threshold in response to receiving the request; determining an optimum a write procedure based at least in part on the comparison; and invoking the optimum write procedure in response to determining the optimum write procedure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
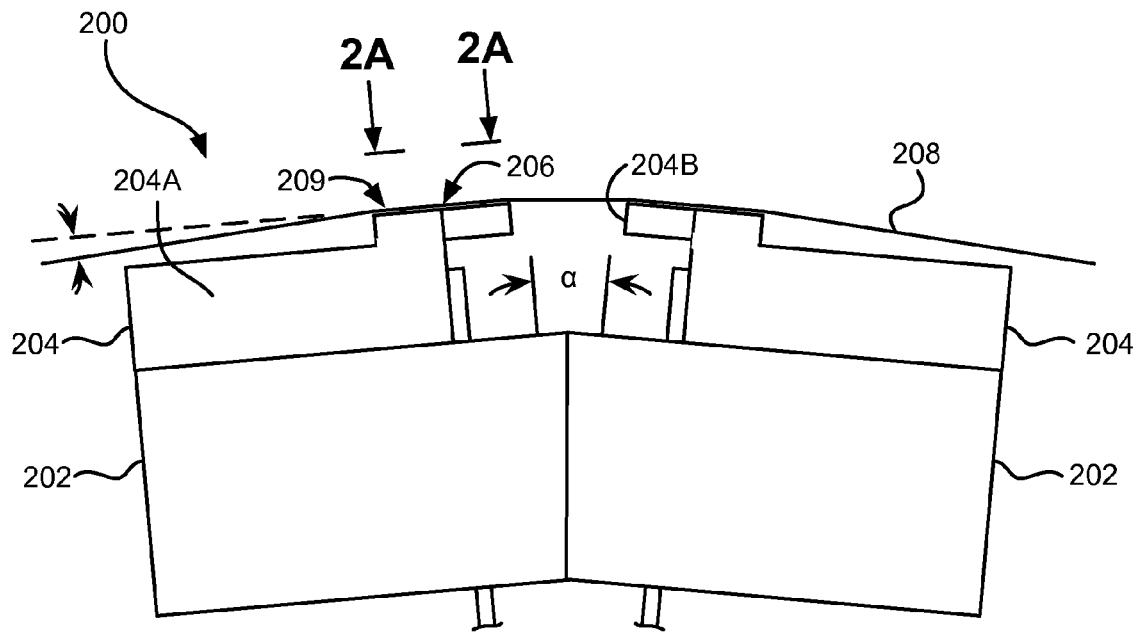
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
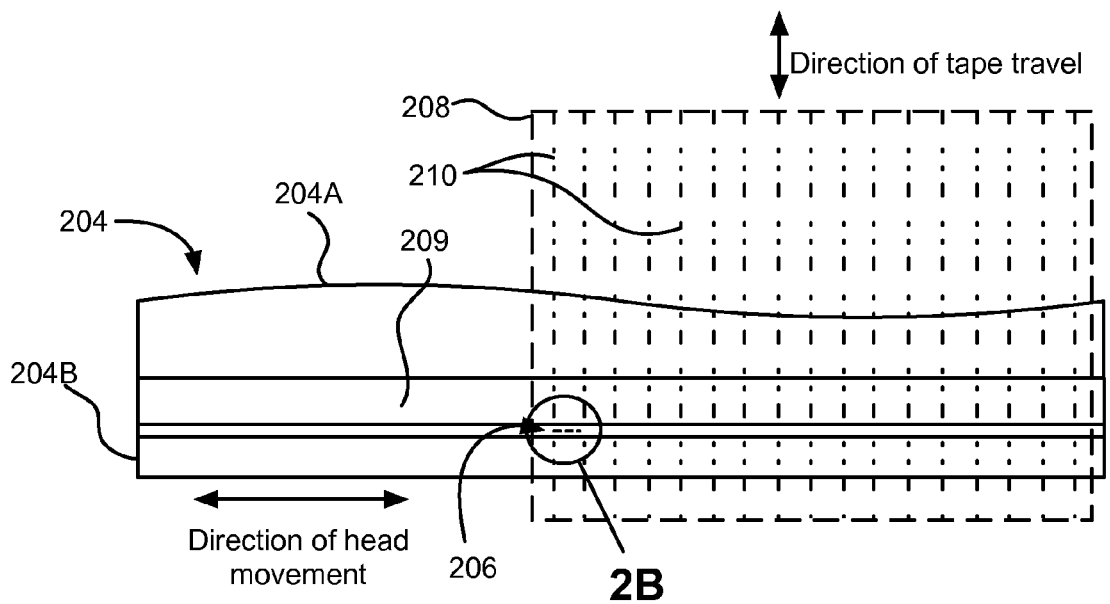
FIG. 2A is a tape bearing surface view taken from Line 2A of FIG. 2, according to one embodiment.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
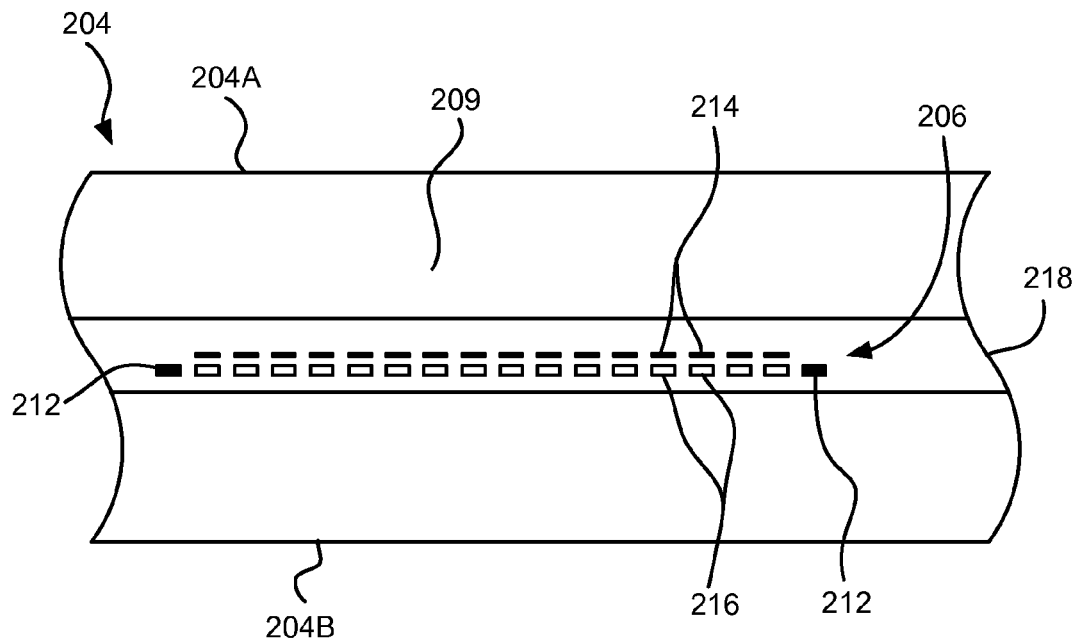
FIG. 2B is a detailed view taken from Circle 2B of FIG. 2A, according to one embodiment.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
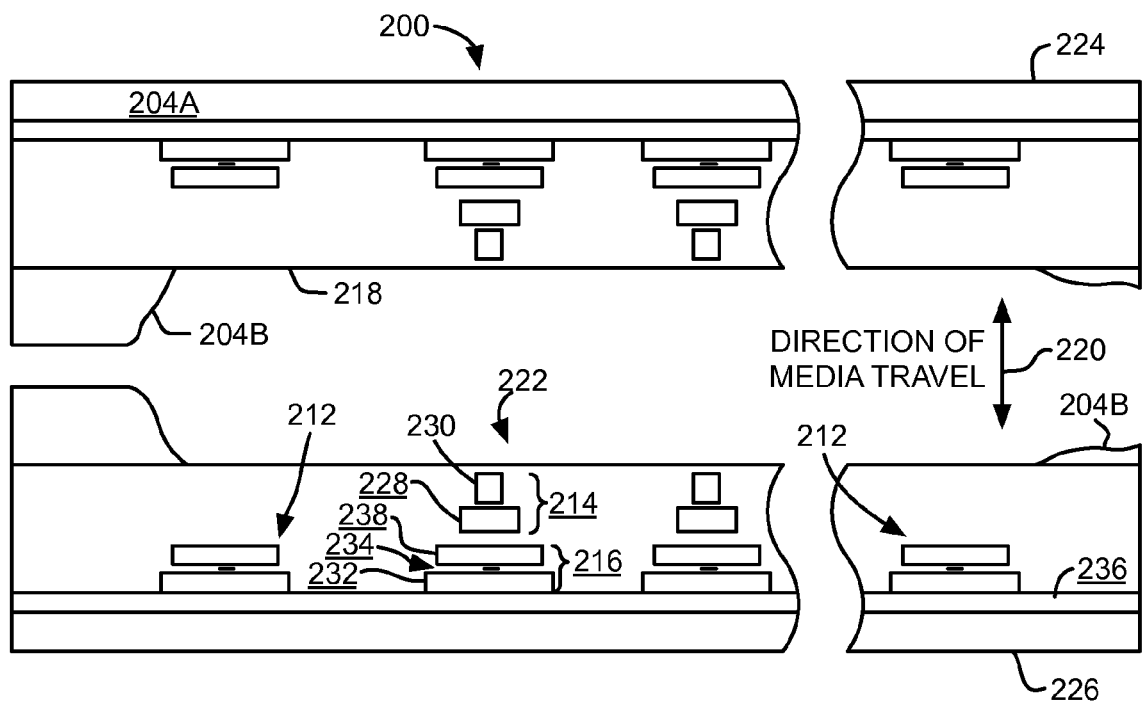
FIG. 2C is a detailed view of a partial tape bearing surface of a pair of modules, according to one embodiment.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 402, 406 each include one or more arrays of writers 410. The inner module 404 of FIG. 3 includes one or more arrays of readers 408 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

In a tape drive system, upon receiving a write request, such as during a sync operation between the tape drive system and a host system, the tape drive system must determine a WP for writing the data to the tape.

Several of the conventional approaches to improving tape drive system performance as understood herein include backhitch WPs, same wrap backhitchless flush (SWBF) WPs such as disclosed in U.S. Pat. No. 7,903,363, incorporated herein by reference, and recursively accumulating backhitchless flush (RABF) WPs such as disclosed in U.S. Pat. No. 6,856,479, incorporated herein by reference, among other equivalent WPs as would be understood by one having ordinary skill in the art upon reading the present descriptions.

For example, WPs may be employed to improve tape drive system performance via maximizing a tape drive storage capacity, maximizing a tape drive write operation fidelity, minimizing a tape drive storage capacity degradation, minimizing a tape drive write operation time, etc. as would be understood by one having ordinary skill in the art upon reading the present descriptions.

As understood herein, a data storage system may be characterized by several performance attributes, including an ideal data capacity, an actual data capacity, a capacity margin, a capacity margin ratio, etc. as would be understood by one having ordinary skill in the art upon reading the present descriptions.

In one embodiment, the ideal data capacity may represent a typical or average maximum data capacity for a particular type of storage system and be reported in a data size unit such as megabytes (MB), gigabytes (GB), terabytes (TB), etc. as would be understood by one having ordinary skill in the art upon reading the present descriptions. Furthermore, the ideal data capacity may be the average or typical storage capacity available to a user, and may be the data capacity reported to the user as the total storage system capacity.

Similarly, the actual data capacity may represent an actual maximum data capacity for a particular type of storage system as observed in practice when performing writes with a very low error rate, in some approaches. As with the ideal data capacity, the actual data capacity may be reported in a data size unit such as megabytes (MB), gigabytes (GB), terabytes (TB), etc. as would be understood by one having ordinary skill in the art upon reading the present descriptions.

In additional embodiments, the capacity margin may represent a difference between the actual data capacity for a particular storage system and the ideal data capacity for the particular storage system. As with the actual data capacity and the ideal data capacity, the capacity margin may be reported in a data size unit such as megabytes (MB), gigabytes (GB), terabytes (TB), etc. as would be understood by one having ordinary skill in the art upon reading the present descriptions.

Furthermore, the capacity margin ratio may represent a relative comparison of the capacity margin and the actual data capacity for a particular storage system. The capacity margin ratio may be reported as a ratio, a percentage, a fraction, etc. as would be understood by one having ordinary skill in the art upon reading the present descriptions.

Both capacity margin and capacity margin ratio may represent data storage system performance metrics that are informative regarding the expected and observed error rate and thus overall performance of a particular data storage system in terms of write operation effectiveness and efficiency, among other qualities, as will be appreciated by the skilled artisan reading the present descriptions.

SWBF, RABF, and backhitching WPs may provide improved writing for data storage systems and therefore improve overall system performance, especially over a series of data sync operations between a host transferring data and the data storage system receiving the data for storage. Moreover, each WP offers unique advantages and improvements to the data storage system. For example, backhitching is usually a slower WP with respect to write operation speed than either SWBF or RABF, which may result in slower system performance, but offers the advantage that little or no data capacity may be lost when utilizing backhitching WPs.

On the other hand, SWBF and RABF are usually characterized by fast write operation speeds relative to backhitching, conferring correspondingly faster performance to the storage system. However, SWBF accomplishes faster performance by skipping portions of the storage capacity in response to receiving a request for a write operation to be performed in a tape drive, and accordingly sacrifices storage capacity with each write to the detriment of overall storage capacity for the data storage system utilizing SWBF.

RABF is also often characterized by fast write operation speeds relative to backhitching, but is often slower than SWBF. RABF writes data temporarily in a reserved tape area, skipping some portion of storage capacity, but recursively writes to the original tape area without skipping the portion of storage capacity. Therefore, RABF does not causes capacity loss, in some approaches.

In general, RABF is better method than SWBF if write operations are frequently requested for small data transfer transactions. If sync operation is not so frequently, SWBF is better method than RABF, since the skipping portion by SWBF is not so affect to the total written capacity.

As will be understood by one having ordinary skill in the art upon reading the present descriptions, the above-described WPs may confer improvements to data storage system performance, but each WP carries an associated cost to performance, and therefore it is desirable and advantageous to devise intelligent implementations of the WPs in unison and/or combination to maximize data storage system performance according to the specific needs of a given user, storage facility, storage service provider, etc.

Accordingly, the present descriptions detail several embodiments of an inventive implementation for WPs such as backhitch, SWBF, RABF, etc. as would be understood by one having ordinary skill in the art upon reading the present descriptions. At a high-level, the presently disclosed systems and methods achieve an improved WP performance and confer corresponding improvements to data storage system performance by determining an optimum WP for a given write operation based on one or more of several factors, including an expected transaction size of a subsequent write operation, a capacity margin of a data storage system, an expected writing time for one of more WPs, an expected time remaining until data for the subsequent write operation are ready to write to the data storage system, etc. as would be understood by one having ordinary skill in the art upon reading the present descriptions.

If a transaction requiring writing is a large transaction, and/or if a next transaction scheduled for writing subsequent to writing is a large transaction, backhitching would be expected to take a long time to complete writing to the detriment of overall system performance. Accordingly, conventionally SWBF has been utilized to improve system performance for WP on or in the vicinity of large transactions. Surprisingly, however, the inventors of the presently disclosed systems and methods discovered that, even if a transaction is a large transaction, SWBF is not always the best method for WP from a performance perspective. In particular, in systems where a tape is moving at a relatively slow speed, e.g. to avoid emptying the buffer, SWBF creates more overhead than normal backhitching WPs and fails to confer the typical performance advantages of SWBF WP. Accordingly, in some circumstances backhitch is unexpectedly the superior performing WP from both write speed and data capacity loss perspectives.

To this effect the present descriptions disclose a new methodology for selecting optimum WP for a variety of circumstances and with the surprising insight that normal backhitching or other procedure may confer superior WP and data storage performance for a given set of conditions, even in large transaction sizes. In some approaches the new methodology may determine an optimum WP based on at least the expected transaction size for the next write operation and the expected time remaining until a next transaction is ready for writing. Moreover, the expected transaction size may be compared to one or more thresholds to further define the appropriate optimum WP according to expected transaction size.

In some approaches, an expected transaction size for the next write operation may comprise an estimated transaction size based on an average transaction size of one or more previous transactions. In preferred embodiments, the expected transaction size for the next write operation may be an average of two, three or four immediately previous transaction sizes.

Moreover, the presently described systems and methods may employ one or more thresholds against which to compare one or more of the above-described factors to assist in determining which WP would be optimal for a given write operation under the particular circumstances of the write and/or the data storage environment. In several approaches, a plurality of transaction size thresholds may be employed, and a first transaction size threshold may represent a boundary between large and mid-sized transactions. Moreover, a second transaction size threshold may represent a boundary between mid and small-sized transactions, in some approaches. Such thresholds may be predefined for a given drive and/or media type, selected by a user, programmed into the drive, etc.

Furthermore, several exemplary comparisons between thresholds and the above-described factors are disclosed herein. As would be understood by one having ordinary skill in the art upon reading the present descriptions, each of the comparisons may be performed according to a variety of criteria. For example, a condition may be satisfied where a factor value is greater than a threshold, greater than or equal to a threshold, equal to a threshold, less than a threshold, or less than or equal to a threshold, in various approached.

As understood herein, an "optimum" WP may be understood to represent an WP that accomplishes superior performance improvements for a data storage system undergoing one or more write operations. Superior performance may be defined according to any measure desired or required by a given user, storage system, storage service provider, etc. as would be understood by one having ordinary skill in the art upon reading the present descriptions.

For example, in some embodiments high-speed performance may be preferred over efficient data capacity usage, and the presently described systems and methods may select the "optimum" WP that provides maximum write operation speed. In other approaches, efficient use of data capacity may be preferred over write operation speed, and the presently described systems and methods may select the "optimum" WP that provides maximum efficiency to data capacity usage. Of course, other performance characteristics may be preferred in different situations and the presently disclosed systems and methods may be optimized to provide desired data storage system performance in terms of each of a variety of performance characteristics as would be understood by one having ordinary skill in the art upon reading the present descriptions.

According to one embodiment, a tape drive system includes: a read channel; a write channel; logic configured to receive a request for a write operation; logic configured to determine an optimum a WP in response to receiving the request, the determining being based on expected writing times of each of a plurality of WPs and an expected transaction size of a next write operation; and logic configured to invoke the determined optimum WP in response to determining the optimum WP.

Preferably, the determining is based on expected writing times relative to two thresholds. In some embodiments, the two thresholds may include a first transaction size threshold and a second transaction size threshold. In preferred embodiments, the first transaction size threshold is greater than the second transaction size threshold.

Moreover, in additional embodiments invoking the optimum WP may effectively maintain a capacity margin ratio of about 10% or less, and in preferred embodiments a capacity margin ratio of about 7% or less.

In more embodiments, the logic configured to determine the optimum WP may include logic configured to determine a capacity margin ratio; logic configured to determine the expected transaction size of the next write operation; logic configured to calculate the expected writing time for each of the plurality of WPs, each WP being selected from a group consisting of: a backhitch WP, a same wrap backhitchless flush (SWBF) WP, and a recursively accumulating backhitchless flush (RABF) WP; and logic configured to determine an expected time remaining until the next write operation, where determining the optimum WP is further based on the expected time remaining until the next write operation.

In still more embodiments, the SWBF WP may be selected as the optimum WP in response to the following conditions being satisfied: the expected transaction size of the next write operation is greater than a first transaction size threshold; the SWBF WP expected writing time is less than the backhitch WP expected writing time; the expected time remaining until the next write operation is less than the SWBF WP expected writing time; and the capacity margin ratio is greater than a predetermined value.

In some embodiments, the predetermined value may be a value determined to be adequate for the SWBF WP for the given drive and/or tape; a selected value such as 10%, 7%, etc. as would be understood by one having ordinary skill in the art upon reading the present descriptions. Moreover, one advantage of such embodiments is that data will be ready in time for SWBF to save time, and SWBF sufficiently faster than backhitch to justify SWBF in view of capacity margin to save write time. This embodiment also saves time/processing power by omitting any further comparison between SWBF, RABF and backhitch WPs.

In further embodiments, the SWBF WP may be selected as the optimum WP in response to the following conditions being satisfied: the expected transaction size of the next write operation is less than a first transaction size threshold and greater than a second transaction size threshold; the expected time remaining until the next write operation is less than the SWBF WP expected writing time; and the capacity margin ratio is greater than a predetermined value.

According to such embodiments, data will be ready in time for SWBF to save time, and SWBF is sufficiently faster than backhitch to justify SWBF in view of capacity margin to save write time. Such embodiments also save time/processing power by omitting any further comparison between SWBF, RABF and backhitch WPs.

Furthermore, in some approaches the RABF WP may be selected as the optimum WP in response to the transaction size of the next write operation being less than a second transaction size threshold because RABF WP is surprisingly faster than normal backhitch WP for small transactions.

Moreover, in additional and/or alternative approaches the RABF WP may be selected as the optimum WP in response to the following conditions being satisfied: the expected transaction size of the next write operation is less than a first transaction size threshold and greater than a second transaction size threshold; and the capacity margin ratio is less than a predetermined value.

Moreover still the RABF WP may be selected as the optimum WP in response to the following conditions being satisfied, according to one embodiment: the expected transaction size of the next write operation is less than a first transaction size threshold and greater than a second transaction size threshold; the expected time remaining until the next write operation is greater than the SWBF WP expected writing time; and the capacity margin ratio is greater than a predetermined value. In one approach, the backhitch WP is selected as the optimum WP in response to the following conditions being satisfied: the expected transaction size of the next write operation is greater than a first transaction size threshold; the SWBF expected writing time of the next write operation is greater than the backhitch WP expected writing time; and the capacity margin ratio is greater than a predetermined value.

In another approach, the backhitch WP is selected as the optimum WP in response to the following conditions being satisfied: the expected transaction size of the next write operation is greater than a first transaction size threshold; the SWBF expected writing time of the next write operation is less than the backhitch WP expected writing time; the capacity margin ratio is greater than a predetermined value; and the expected time remaining until the next write operation is greater than the SWBF WP expected writing time.

The presently systems may also be embodied as a data storage system, including a tape drive system as described in any of the embodiments herein; a drive mechanism for passing a magnetic medium over a magnetic head; and a controller electrically coupled to the magnetic head.

Figure 5:
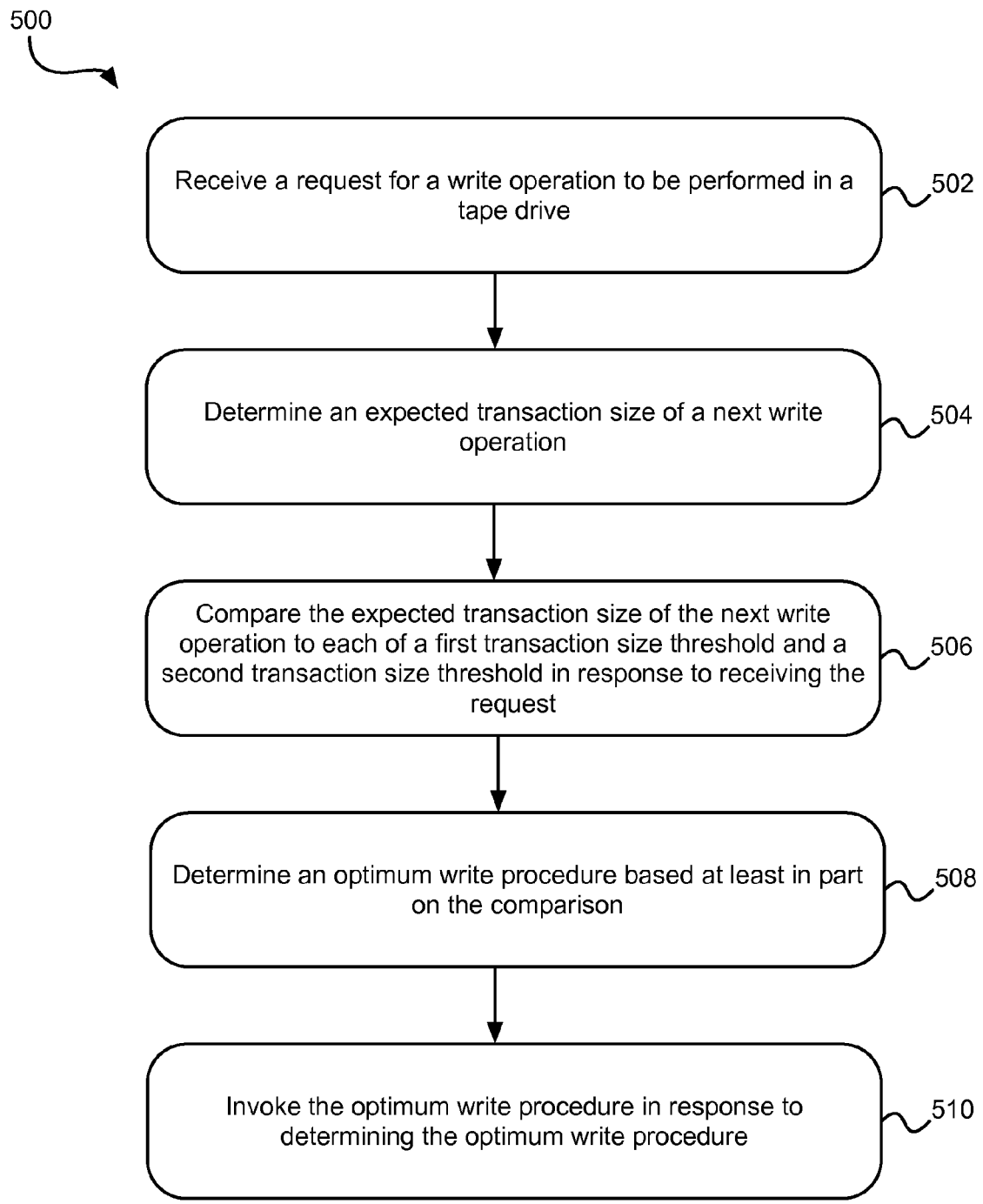
FIG. 5 is a flowchart of a method, according to one embodiment.

Referring now to FIG. 5, a method 500 is shown, according to one embodiment. As described and understood herein, the method 500 may be performed in any suitable environment, including the environments of FIGS. 1-4, among others.

In one embodiment, method 500 includes operation 502, where a request for a write operation to be performed in a tape drive is received.

In operation 504, an expected transaction size of a next write operation is determined.

In operation 506, the expected transaction size of the next write operation is compared to each of a first transaction size threshold and a second transaction size threshold in response to receiving the request.

In operation 508, an optimum a WP is determined based at least in part on the comparison in operation 506.

In operation 510, the optimum WP is invoked in response to determining the optimum WP in operation 508.

According to some embodiments of the presently disclosed systems and methods, the first transaction size threshold may be greater than the second transaction size threshold, and the optimum WP may be selected from among a backhitch WP, a same wrap backhitchless flush (SWBF) WP, and a recursively accumulating backhitchless flush (RABF) WP.

In some embodiments, a tape drive performing the write operation maintains a capacity margin ratio of less than 10%, preferably less than about 7.0% by invoking the optimum WP.

Figure 6:
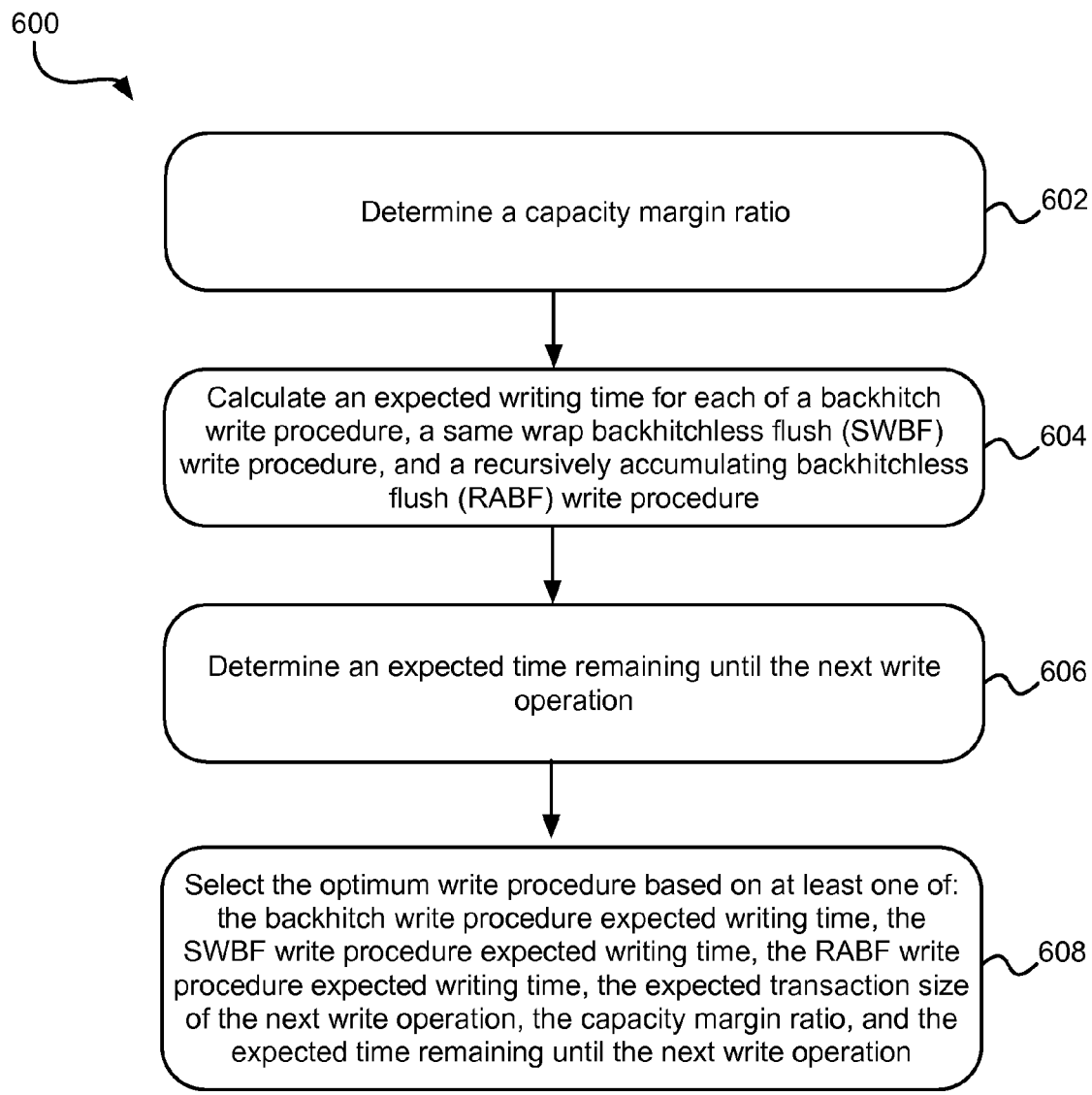
FIG. 6 is a flowchart of a method, according to one embodiment.

Referring now to FIG. 6, a method 600 is shown, according to one embodiment. As described and understood herein, the method 600 may be performed in any suitable environment, including the environments of FIGS. 1-4, among others.

In one embodiment, method 600 further defines the methodology for determining the optimum WP. For example, in one embodiment determining the optimum WP may include operation 602, where a capacity margin ratio is determined, e.g. a capacity margin ratio of the tape drive performing the write operation.

In operation 604, an expected writing time is calculated for each of the backhitch WP, the SWBF WP, and the RABF WP.

In operation 606, an expected time remaining until the next write operation is determined.

Figure 7:
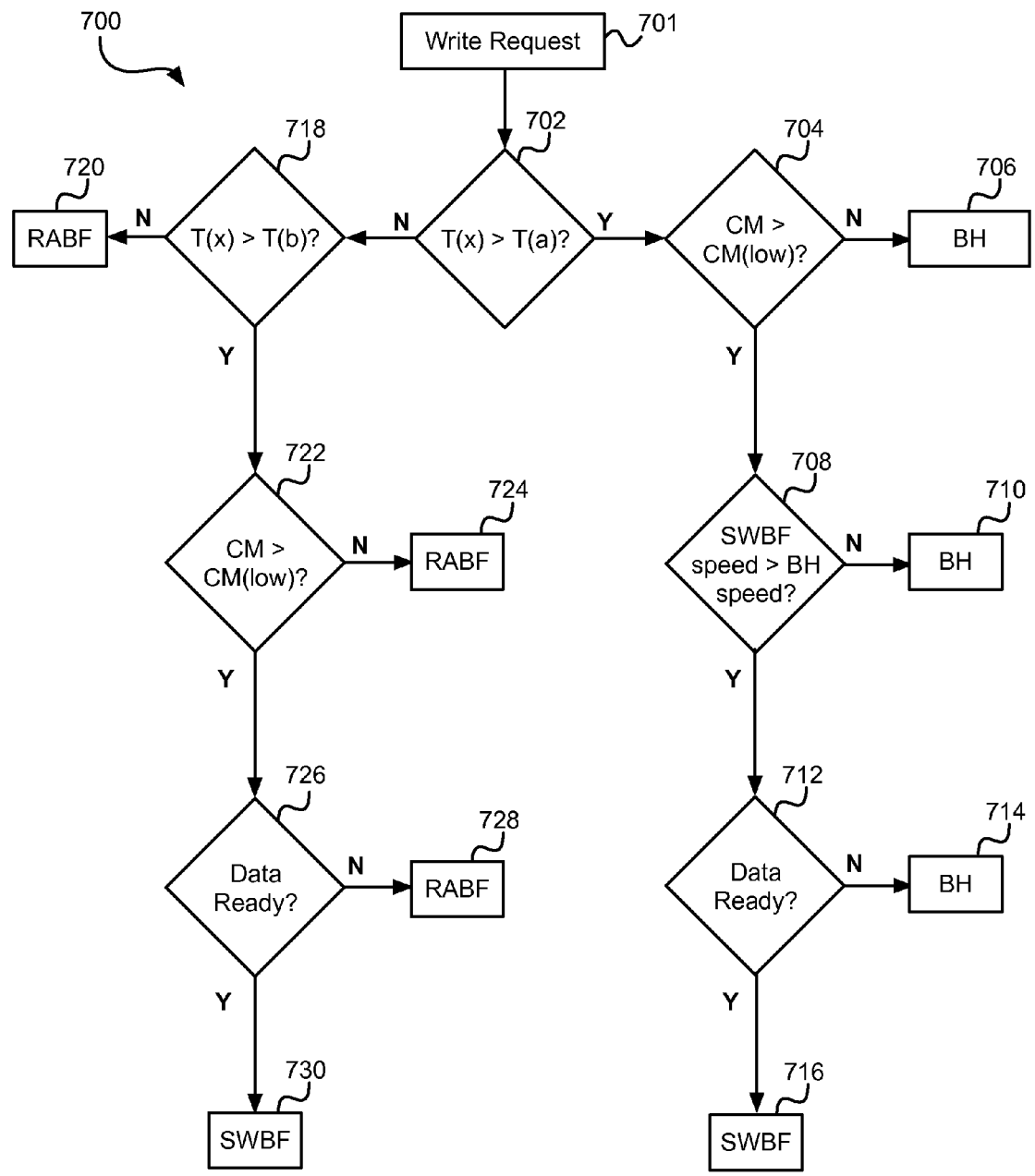
FIG. 7 shows a schematic of a decision tree for determining an optimum write procedure, according to one embodiment.

In operation 608, where the optimum WP is selected based on at least one of: the backhitch WP expected writing time, the SWBF WP expected writing time, the RABF WP expected writing time, the expected transaction size of the next write operation, the capacity margin ratio, and the expected time remaining until the next write operation Referring now to FIG. 7, an exemplary decision tree 700 according to one implementation of the presently disclosed systems and methods is shown. In general, improved writing and correspondingly improved data storage system performance may be conferred by employing decision tree 700 in various approaches.

As shown in FIG. 7, upon receiving a request for a write operation to be performed in a tape drive at start point 701, an expected transaction size T(x) is compared to a first transaction size threshold T(a) in decision point 702. If the expected transaction size is larger than the first transaction size threshold, this indicates that the transaction is a "large transaction," and the analysis continues by determining whether a capacity margin CM of a data storage system is greater than a minimum capacity margin CM(low) required to support SWBF WP in decision point 704.

If the capacity margin is insufficient to support SWBF WP, then the analysis concludes that normal backhitch WP BH is the optimum WP under the circumstances in conclusion point 706. Otherwise, the capacity margin is insufficient to support SWBF WP, then the analysis continues by determining whether SWBF WP is expected to be faster than normal backhitch WP in decision point 708. In some approaches, this determination may be made according to the calculated expected elapsed time for each WP substantially as disclosed in U.S. Pat. Nos. 7,710,681 and 8,035,912.

As would be understood by one having ordinary skill in the art upon reading the present descriptions, the advantage of SWBF relative to normal backhitch writing is that SWBF is faster, but the increased speed comes at a price of lost capacity. Accordingly, upon receiving a request for a write operation, utilizing SWBF to perform the write will unnecessarily sacrifice data capacity without conferring any speed advantage if backhitch writing is faster than SWBF under the circumstances. Accordingly, in such situations normal backhitch writing may be preferred in order to maximize storage capacity and write speed performance. In one embodiment, where SWBF WP is expected to be slower than backhitch WP, then backhitch WP is chosen as the optimum WP under the circumstances such as shown in conclusion point 710 of FIG. 7.

Alternatively, if SWBF WP is determined to be faster than backhitch WP in decision point 708, then the analysis continues by determining whether the next transaction will be ready for writing before SWBF WP is expected to complete writing in decision point 712. If the next transaction will be ready for subsequent writing before SWBF WP is expected to complete writing, then the analysis concludes that SWBF WP is the optimum WP under the circumstances as shown in conclusion point 716. Otherwise, if the next transaction will not be ready for subsequent writing before SWBF WP is expected to complete writing, then the analysis concludes that backhitch WP is the optimum WP under the circumstances as shown in conclusion point 714.

As will be appreciated by the skilled artisan reading the present descriptions, even if a transaction is large, sufficient capacity margin exists to support SWBF WP, and SWBF WP is expected to be faster than backhitch WP, unnecessary data capacity loss will occur if SWBF WP is selected as the optimum WP but data would not be ready for subsequent writing for an amount of time greater than the expected SWBF WP write time, especially if the data would not be ready for subsequent writing for an amount of time greater than the expected backhitch WP write time. This is because, in the first instance, SWBF would sacrifice capacity and finish writing before the next data are ready for writing, and the system would sit idly for the interim. In the second instance, SWBF would sacrifice capacity where backhitch would not, and both WPs would complete before the next data are ready for subsequent writing, resulting in a complete waste of capacity with no corresponding gain in write performance.

If the transaction is determined not to be a "large transaction" in decision point 702, the expected transaction size is compared to a second transaction size threshold T(b) in decision point 718. If the expected transaction size is less than the second transaction size threshold, this indicates that the transaction is a "small" transaction and the analysis concludes that RABF WP is the optimum WP under the circumstances as shown in conclusion point 720 of FIG. 7.

On the other hand, if the expected transaction size is larger than the second transaction size threshold but less than the first transaction size threshold, this indicates that the transaction is a "mid-sized" transaction and the analysis continues by determining whether a capacity margin CM of a data storage system is greater than a minimum capacity margin CM(low) required to support SWBF WP in decision point 722. If the capacity margin of the data storage system is insufficient to support SWBF, then the analysis concludes that RABF WP is the optimum WP under the circumstances as shown in conclusion point 724 of FIG. 7.

Otherwise, if the capacity margin CM of a data storage system is greater than a minimum capacity margin CM(low) required to support SWBF WP, then the analysis continues by determining whether the next transaction will be ready for writing before SWBF WP is expected to complete writing in decision point 726. If the next transaction will be ready for subsequent writing before SWBF WP is expected to complete writing, then the analysis concludes that SWBF WP is the optimum WP under the circumstances as shown in conclusion point 728. Otherwise, if the next transaction will not be ready for subsequent writing before SWBF WP is expected to complete writing, then the analysis concludes that RABF WP is the optimum WP under the circumstances as shown in conclusion point 730.

The decision tree 700 shown in FIG. 7 may also be represented as micro-code containing nested logic statements as shown below, in one embodiment.

```
If (Tx size >= Tx_Threshold_A ) {
    If (capacity margin is sufficient for SWBF ) {
        If (SWBF is faster than Normal Backhitch Writing ) {
            If ( next data is available within the remaining time )
                -> Write with SWBF
            else {
                -> Write with backhitch.}
        else {
            -> Write with backhitch }
    else{
        -> Write with backhitch }
}
else if ( Tx size >= Tx_Threshold_B) {
    If (capacity margin is sufficient for SWBF ){
        If ( next data is available within the remaining time ){
            -> Write with SWBF}
        else {
            -> Write with RABF}
    else {
        -> Write with RABF}
else if ( Tx size < Tx_Threshold_B ){
    -> Write with RABF}
}
```

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

For example, in one embodiment the inventive computer program product as disclosed herein may be a computer program product comprising non-transitory computer readable program code embodied on a computer readable storage medium, the computer readable program code including computer readable program code configured to receive a request for a write operation to be performed in a tape drive by a tape drive; computer readable program code configured to determine an expected transaction size of a next write operation; computer readable program code configured to compare the expected transaction size of the next write operation to each of a first transaction size threshold and a second transaction size threshold in response to receiving the request; computer readable program code configured to determine an optimum a WP based at least in part on the comparison; and computer readable program code configured to invoke the optimum WP in response to determining the optimum WP, where the first transaction size threshold is greater than the second transaction size threshold, and where the optimum WP is selected from the group consisting of: a backhitch WP, a same wrap backhitchless flush (SWBF) WP, and a recursively accumulating backhitchless flush (RABF) WP.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   receiving a request for a write operation to be performed in a tape drive;
   determining a capacity margin ratio of the tape drive;
   determining an optimum a write procedure based at least in part on the capacity margin ratio, wherein determining the optimum write procedure comprises:
     calculating an expected writing time for each of a backhitch write procedure, a SWBF write procedure, and a RABF write procedure;
     determining an expected time remaining until a next write operation; and
     selecting the optimum write procedure based on at least one of: the backhitch write procedure expected writing time, the SWBF write procedure expected writing time, the RABF write procedure expected writing time, the capacity margin ratio, and the expected time remaining until the next write operation; and
   invoking the optimum write procedure in response to determining the optimum write procedure, and
   wherein the optimum write procedure is selected from the group consisting of: the backhitch write procedure, the same wrap backhitchless flush (SWBF) write procedure, and the recursively accumulating backhitchless flush (RABF) write procedure.

2. The method as recited in claim 1, further comprising: determining an expected transaction size of a next write operation; and
   comparing the expected transaction size of the next write operation to each of a first transaction size threshold and a second transaction size threshold in response to receiving the request,
   wherein the optimum write procedure is determined further based at least in part on a result of the comparing.

3. The method as recited in claim 1, wherein the SWBF write procedure is selected as the optimum write procedure in response to determining the capacity margin ratio is greater than a predetermined value.

4. The method as recited in claim 3, wherein the SWBF write procedure is selected as the optimum write procedure further in response to determining one or more of:
   an expected transaction size of a next write operation is less than a first transaction size threshold and greater than a second transaction size threshold; and an expected time remaining until the next write operation is less than a SWBF write procedure expected writing time.

5. The method as recited in claim 1, wherein the RABF write procedure is selected as the optimum write procedure in response to determining the capacity margin ratio is less than a predetermined value.

6. The method as recited in claim 5, wherein the RABF write procedure is selected as the optimum write procedure further in response to determining one or more of:
 an expected transaction size of a next write operation is less than a first transaction size threshold and greater than a second transaction size threshold; and
 an expected time remaining until the next write operation is greater than a SWBF write procedure expected writing time.

7. The method as recited in claim 1, wherein the backhitch write procedure is selected as the optimum write procedure in response to determining the capacity margin ratio is greater than a predetermined value.

8. The method as recited in claim 7, wherein the backhitch write procedure is selected as the optimum write procedure further in response to determining one or more of:
 an expected transaction size of a next write operation is greater than a first transaction size threshold;
 a SWBF expected writing time of the next write operation is less than the backhitch write procedure expected writing time; and
 an expected time remaining until the next write operation is greater than the SWBF write procedure expected writing time.

9. The method as recited in claim 1, wherein the capacity margin ratio is
 characterized by a value in a range from 0% to 100%, and
 wherein invoking the optimum write procedure maintains the value of the capacity margin ratio below about 10%.

10. The method as recited in claim 1, wherein the capacity margin ratio is a ratio between a capacity margin of the tape drive and an actual data capacity of the tape drive.

11. The method as recited in claim 10, wherein the capacity margin is a difference between an actual data capacity of the tape drive and an ideal data capacity of the tape drive.

12. The method as recited in claim 1, wherein at least one of a first transaction size threshold and a second transaction size threshold is based on one or more factors selected from:
 a drive type corresponding to the tape drive;
 a media type corresponding to the tape drive;
 a user-defined value; and
 a predefined value programmed into the tape drive.

13. The method as recited in claim 1, further comprising determining an expected transaction size of a next write operation,
 wherein the expected transaction size of the next write operation comprises an average of at least two immediately previous transaction sizes, and
 wherein determining the optimum write procedure is further based on the expected transaction size of the next write operation.

14. The method as recited in claim 1, wherein the optimum write procedure is determined from among a plurality of candidate write procedures,
 wherein the optimum write procedure is characterized by a minimum tape drive storage capacity degradation, and
 wherein each candidate write procedure is characterized by a tape drive storage capacity degradation greater than the minimum tape drive storage capacity degradation.

15. The method as recited in claim 1, wherein the optimum write procedure is determined from among a plurality of candidate write procedures,
 wherein the optimum write procedure is characterized by a maximum data usage efficiency, and
 wherein each candidate write procedure is characterized by a data usage efficiency less than the maximum data usage efficiency.

16. The method as recited in claim 1, wherein the optimum write procedure is determined from among a plurality of candidate write procedures,
 wherein the optimum write procedure is characterized by a maximum write operation speed, and
 wherein each candidate write procedure is characterized by a write operation speed less than the maximum write operation speed.

17. The method as recited in claim 1, wherein the optimum write procedure is determined from among a plurality of candidate write procedures,
 wherein the optimum write procedure is characterized by at least two of:
  a maximum data usage efficiency;
  a maximum write operation speed; and
  a minimum tape drive storage capacity degradation, and
 wherein each candidate write procedure is characterized by at least two of:
  a data usage efficiency less than the maximum data usage efficiency,
  a write operation speed less than the maximum write operation speed; and
  a tape drive storage capacity degradation greater than the minimum tape drive storage capacity degradation.

18. A computer program product comprising a non-transitory computer readable program medium having stored thereon computer readable program instructions configured to cause a tape storage system to perform a method comprising:
 receiving a request for a write operation to be performed in a tape drive;
 determining a capacity margin ratio of the tape drive;
 determining an optimum a write procedure based at least in part on the capacity margin ratio; and
 invoking the optimum write procedure in response to determining the optimum write procedure,
 wherein the optimum write procedure is selected from the group consisting of: a backhitch write procedure, a same wrap backhitchless flush (SWBF) write procedure, and a recursively accumulating backhitchless flush (RABF) write procedure; and
 wherein determining the optimum write procedure comprises:
  calculating an expected writing time for each of the backhitch write procedure, the SWBF write procedure, and the RABF write procedure;
  determining an expected time remaining until a next write operation; and
  selecting the optimum write procedure based on at least one of: the backhitch write procedure expected writing time, the SWBF write procedure expected writing time, the RABF write procedure expected writing time, the capacity margin ratio, and the expected time remaining until the next write operation.

19. A method, comprising:
 receiving a request for a write operation to be performed in a tape drive;
 determining an expected transaction size of a next write operation;

comparing the expected transaction size of the next write operation to each of a first transaction size threshold and a second transaction size threshold in response to receiving the request;

determining an optimum a write procedure based at least in part on a result of the comparing; and invoking the optimum write procedure in response to determining the optimum write procedure, wherein the first transaction size threshold is greater than the second transaction size threshold, wherein the optimum write procedure is selected from the group consisting of: a backhitch write procedure, a same wrap backhitchless flush (SWBF) write procedure, and a recursively accumulating backhitchless flush (RABF) write procedure, wherein determining the optimum write procedure comprises:

determining a capacity margin ratio;

calculating an expected writing time for each of the backhitch write procedure, the SWBF write procedure, and the RABF write procedure;

determining an expected time remaining until the next write operation; and selecting the optimum write procedure based on at least one of: the backhitch write procedure expected writing time, the SWBF write procedure expected writing time, the RABF write procedure expected writing time, the expected transaction size of the next write operation, the capacity margin ratio, and the expected time remaining until the next write operation.

* * * * *